United States Patent
Wada

[11] Patent Number: 6,131,683
[45] Date of Patent: *Oct. 17, 2000

[54] ELECTRIC BICYCLE

[75] Inventor: Masami Wada, Takefu, Japan

[73] Assignee: Matsushita Electric Industrial Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/754,930

[22] Filed: Nov. 25, 1996

[30] Foreign Application Priority Data

Nov. 29, 1995 [JP] Japan ................................. 7-310458

[51] Int. Cl.[7] ................................................ B62M 23/02
[52] U.S. Cl. ........................... 180/220; 180/216; 180/291
[58] Field of Search .................................. 180/220, 216, 180/65.1, 291; 148/302; 310/67 A, 67 R, 44, 254, 268

[56] References Cited

U.S. PATENT DOCUMENTS

| | | | |
|---|---|---|---|
| 4,337,568 | 7/1982 | Morisawa | 29/598 |
| 4,689,163 | 8/1987 | Yamashita et al. | 252/62.54 |
| 4,862,395 | 8/1989 | Fey et al. | 364/561 |
| 5,144,183 | 9/1992 | Farrenkopf | 310/268 |
| 5,474,148 | 12/1995 | Takata | 180/206 |
| 5,670,838 | 9/1997 | Everton | 310/254 |
| 5,749,429 | 5/1998 | Yamauchi et al. | 180/205 |
| 5,758,736 | 6/1998 | Yamauchi | 180/220 |
| 5,798,702 | 8/1998 | Okamoto et al. | 340/636 |
| 5,853,062 | 12/1998 | Hulett | 180/206 |
| 5,909,781 | 6/1999 | Yonekawa et al. | 180/206 |

FOREIGN PATENT DOCUMENTS

| | | |
|---|---|---|
| 636 536 | 2/1995 | European Pat. Off. . |
| 736 449 | 10/1996 | European Pat. Off. . |
| 739 812 | 10/1996 | European Pat. Off. . |
| 743 238 | 11/1996 | European Pat. Off. . |
| 3 117 415 | 11/1982 | Germany . |
| 9 407 684 | 7/1994 | Germany . |
| 7-040878 | 2/1995 | Japan . |
| 2 249 529 | 5/1992 | United Kingdom . |

*Primary Examiner*—Kevin Hurley
*Attorney, Agent, or Firm*—Parkhurst & Wendel, L.L.P.

[57] ABSTRACT

An electric bicycle 1 comprises a motor powered driving assembly 2 including a flat type DC motor a speed reduction mechanism, a control circuit, a pedal load sensor, and a pedal rotation speed sensor which are integrally assembled together, the motor powered driving assembly being disposed adjacent a lower median portion of a body frame. Through this arrangement it is possible to provide an electric bicycle which affords ease of control and good riding comfort and has relatively low center of gravity.

12 Claims, 2 Drawing Sheets

ELECTRIC BICYCLE

FIELD OF THE INVENTION

This invention relates to an electric bicycle capable of actuating a motor powered driving assembly according to the pedal load and, more particularly, to an electric bicycle having a motor powered driving assembly operative to detect the speed of the bicycle and assist the pedal load within predetermined limits.

BACKGROUND OF THE INVENTION

Hitherto, there have been proposed various electric bicycles of the type having a manually operated driving power and a motor operated driving power arranged in parallel such that the former driving power is assisted by means of an electric motor within a predetermined range which varies according to the pedal load. In such an electric bicycle, it is necessary to control the range of assistance by a motor powered driving assembly in such a manner that such assistance be 50% of bicycle speed in the case of a bicycle speed of from 0 to 15 km/h and, within a bicycle speed range of from 15 km/h to 24 km/h, it be gradually decreased according to the bicycle speed, the assistance being reduced to 0% when a bicycle speed of 24 km/h is reached.

Therefore, the motor powered driving assembly includes a pedal load sensor for detecting a pedal load, a pedal speed sensor for detecting the rotational speed of the pedal, an electric motor, a speed reduction mechanism, and a control circuit. The control circuit controls the electric motor on the basis of information from both the pedal load sensor and pedal speed sensor so as to provide for power assistance within the predetermined range.

In addition, the electric bicycle has a rechargeable battery for use as an electric energy source.

Specifically, one such prior art arrangement is disclosed in Japanese Patent Application Laid-Open No. 7-40878. In this prior art arrangement, a motor powered driving assembly is set up integrally with the bicycle at a location adjacent main pipe and seat pipe members of the body frame. In fact, however, it has been difficult to arrange that all components of the assembly, including an electric motor, a speed reduction mechanism, a control circuit, a pedal load sensor, and a pedal speed sensor, are integrally mounted together beneath a pedal crank shaft.

Further, components such as electric motor, speed reduction mechanism, control circuit, pedal load sensor, and pedal speed sensor are arranged in spaced apart relation, and this requires wiring for electrically interconnecting these components. Therefore, for protection of the wiring it is necessary to cover the entire assembly of such components with a resin cover.

Whilst, from the standpoints of ease of riding and ease of handling, the position of gravity center of the bicycle is important. In this connection, it must be considered that the weight of the rider is considerably heavier than the weight of the bicycle, so that the center of gravity during bicycle riding is positioned considerably higher than the gravity center of the bicycle itself. Therefore, it is required that the position of gravity center of the bicycle itself be set as much low as possible and centrally between the front and rear wheels.

However, with prior art electric bicycles, it is inevitable that the center of gravity of the bicycle is positioned rather high since the motor powered driving assembly is mounted in an inner space defined by bicycle frame members or above the pedal crank shaft. As such, the prior art electric bicycles have been unsatisfactory from the view points of ease of riding and ease of handling.

DISCLOSURE OF THE INVENTION

This invention is directed to solving the foregoing problems and has as its object the provision of an electric bicycle having its center of gravity positioned relatively low which can afford good riding comfort and ease of handling.

In order to accomplish the above object, the electric bicycle in accordance with the invention comprises a motor powered driving assembly operative to assist a pedal driving assembly which is disposed in a lower median portion of a body frame constructed integrally with a front wheel, a saddle, and a rear wheel.

According to such arrangement of the invention, it is possible to maintain the gravity center of the bicycle itself at a lower position without detriment to riding comfort and ease of control, because the motor powered driving assembly is incorporated in a lower median portion of the body frame. Further, the invention affords ease of mounting to the bicycle of the motor powered driving assembly.

In the electric bicycle of the invention, the motor powered driving assembly may be disposed beneath a saddle pipe, with a pedal shaft of the pedal driving assembly being disposed in the motor powered driving assembly. This arrangement enables the gravity center of the bicycle to be maintained lower.

In a first embodiment of the invention, the motor powered driving assembly comprises an electric motor, a speed reduction mechanism, a pedal rotation speed sensor, a pedal load sensor, and a control circuit which are integrally assembled together.

According to the first embodiment, it is possible to incorporate the motor powered driving assembly into a lower median portion of the body frame.

In a second embodiment of the invention, at least a portion of the motor powered driving assembly is exposed.

According to the second embodiment, during a bicycle run, wind comes in direct contact with the motor powered driving assembly so that cooling of the motor powered driving assembly can be enhanced. Therefore, any heat generated from a flat type DC motor and/or the control circuit can be released without provision of any special means.

In a third embodiment of the invention, the electric motor which is incorporated in the motor powered driving assembly is a flat type DC motor.

According to the third embodiment, when the motor powered driving assembly is mounted in a lower median portion of the body frame, it is possible to provide, without detriment to bicycle controllability, a dimensional configuration adapted for mounting the driving assembly in a space between front and rear wheels allowed for the purpose.

In a fourth embodiment of the invention, the flat type DC motor is an axial hollow type motor.

According to the fourth embodiment, the axial dimensional size of the motor, that is, thickness of the motor, can be reduced.

In a fifth embodiment of the invention, a permanent magnet used in the flat type DC motor of the motor powered driving assembly is such that it is comprised of a mixture of an isotropic Nd—Fe—B magnetic powder and an anisotropic Nd—Fe—B magnetic powder which has been set into shape by Joule heated sintering.

According to the fifth embodiment, by virtue of the permanent magnet with temperature characteristics allowing for the size limitation and use environment, it is possible to provide required motor characteristics.

In a sixth embodiment of the invention, an armature of the flat type DC motor is a coreless armature, and an armature winding and a commutator are integrally formed by resin.

According to the sixth embodiment, it is possible to enhance motor weight reduction and provide improved motor response characteristics, and thus to improve the controllability of the electric bicycle.

In a seventh embodiment, the coreless armature of the flat type DC motor is formed of a resin compound containing soft magnetic powder.

According the seventh embodiment, it is possible to provide higher motor power.

DETAILED DESCRIPTION OF THE EMBODIMENTS

One embodiment of this invention will now be described with reference to FIGS. 1 to 3.

Figure 1:
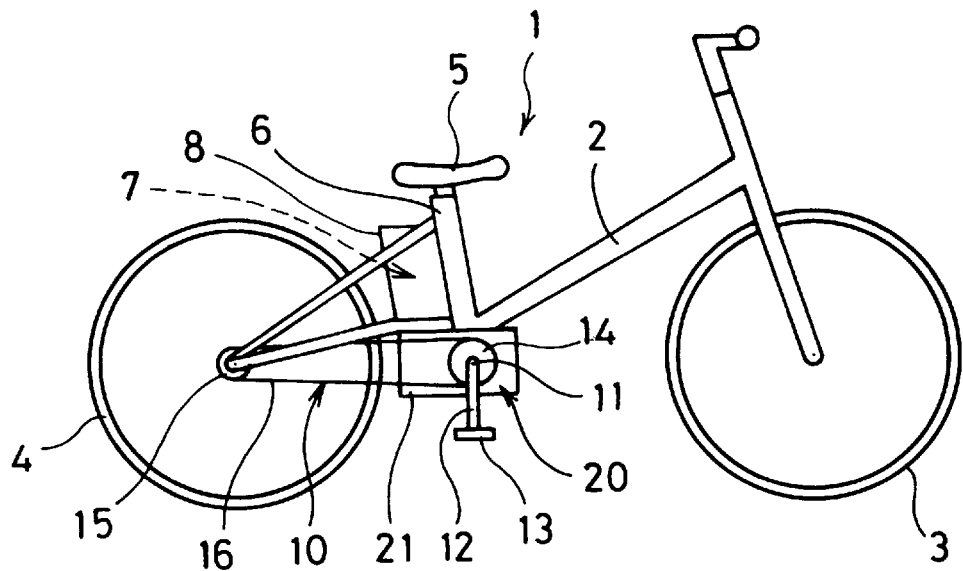
FIG. 1 is a schematic side view showing an electric bicycle according to one embodiment of the invention.

FIG. 1 shows a schematic view of an electric bicycle embodying the invention, the bicycle being shown as having a body frame similar in basic construction to that of a conventional bicycle.

The electric bicycle 1 includes a pedal driving assembly 10 to be driven by man-power and a motor powered driving assembly 20 which assists the pedal driving assembly. The body frame 2 of the electric bicycle 1 comprises a number of pipe elements for integrally interconnecting a front wheel 3, a rear wheel 4, and a saddle 5, the pipes being integrated together at a lower end of a saddle pipe 6 located centrally of the bicycle. The motor powered driving assembly 20, in its entirety, is mounted in a lower median portion of the body frame 2, or beneath the lower end of the saddle pipe 6 in the present case.

In the case of a conventional bicycle a pedal crank shaft is disposed in aforesaid lower median portion, but in the electric bicycle 1 of the invention, a pedal crank shaft 11 of the pedal driving assembly 10 is disposed in the motor powered driving assembly 20. The position of the pedal crank shaft 11 is set so as to enable pedaling operation to be made by the rider while assuming a sitting position on the saddle 5 in substantially same way as in the case of a conventional bicycle. By virtue of this arrangement, the electric bicycle 1 can have a center of gravity maintained lower without detriment to the ease of control and riding comfort.

The pedal crank shaft 11 extends through a casing 21 of the motor powered driving assembly 20, opposite ends of the crank shaft being coupled to cranks 12 which are fitted with pedals 13. A chain 16 is trained between a front sprocket 14 mounted to a crank shaft 12 and a rear sprocket 15 provided on the rear wheel 4 side. These elements 11 to 16 constitute the pedal driving assembly 10.

On the rear side of the saddle pipe 6 there is provided a battery case 8 in which is housed a battery 7.

Figure 2:
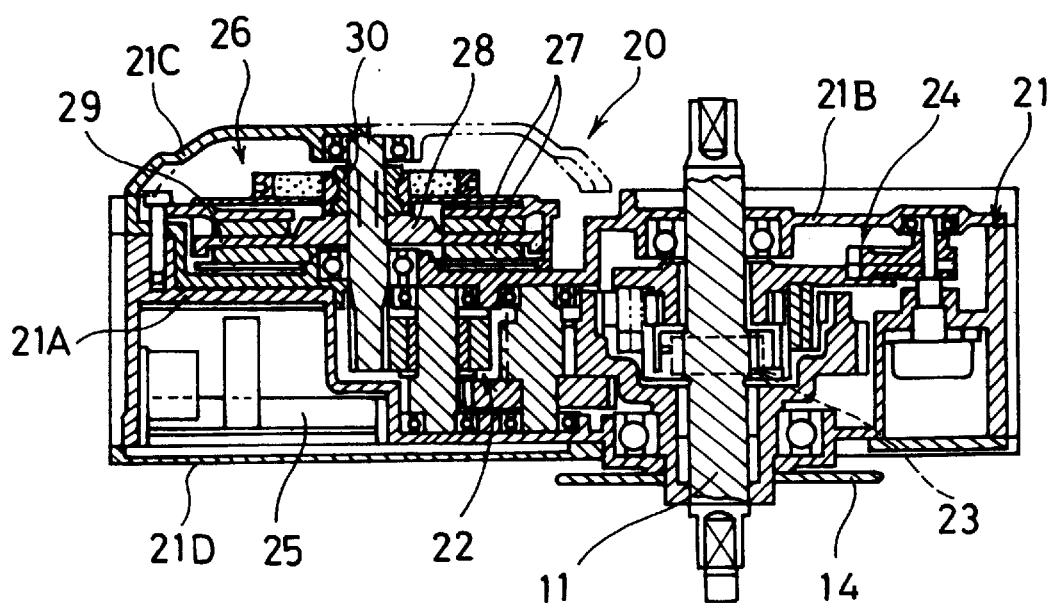
FIG. 2 is a sectional view showing the construction of a motor powered driving assembly according to one embodiment of the invention.

FIG. 2 is a detail view showing the construction of the motor powered driving assembly 20. This motor powered driving assembly 20 is mounted below the body frame 2.

The casing 21 of the motor powered driving assembly 20 comprises a box 21A, a gear cover 21B, a motor cover 21C, and a lid 21D. These members are sealed by means of gasket, so that the motor powered driving assembly 20 is of waterproof construction.

Elements, such as a speed reduction mechanism 22, a pedal rotation speed sensor 23, and a pedal load torque sensor 24, are disposed within a space defined by the box 21A and the gear cover 21B in the casing 21. A control circuit 25 is provided, among others, within a space defined by the box 21A and the lid 21D. Further, a flat type DC motor 26 is disposed, among others, within a space defined by a recessed portion of the gear cover 21B and the motor cover 21C.

So disposed in the casing 21, the speed reduction mechanism 22, the control circuit 25, and the flat type DC motor 26 are integrated together, with the pedal rotation speed sensor 23 and pedal load sensor 24 incorporated in addition to them.

According to such arrangement of the motor powered driving assembly 20, the rotational speed of pedaling is detected by the pedal rotation speed sensor 23 and, at the same time, relevant load torque is detected by the pedal load sensor 24. Then, on the basis of detection values (information) from them, a built-in microcomputer of the control circuit 25 determines a PWM (pulse width modulation) inverter output for actuating the flat type DC motor 26. Thus, by actuating the flat type DC motor 26 through the PWM inverter output to cooperate with man power from the pedal 13 through the intermediary of the speed reduction mechanism 22, rotation effort is transmitted from the front sprocket to the rear wheel 4 through the chain 16 and rear sprocket 15, thereby to provide propulsive power for the electric bicycle 1.

Whilst, from the standpoints of controllability and riding comfort with respect to the electric bicycle 1, the motor powered driving assembly 20 is subject to limitations as to dimensions, configuration and mass effect. That is, the width is limited from pedaling consideration; the height is limited from clearance consideration relative to the ground surface; the length is limited from the consideration of possible interference with the rear wheel 4, and the mass of the assembly is limited by the total mass of the electric bicycle 1. In order to satisfy these dimensional considerations, the flat type DC motor 26 is employed as the source of power.

Figure 3:
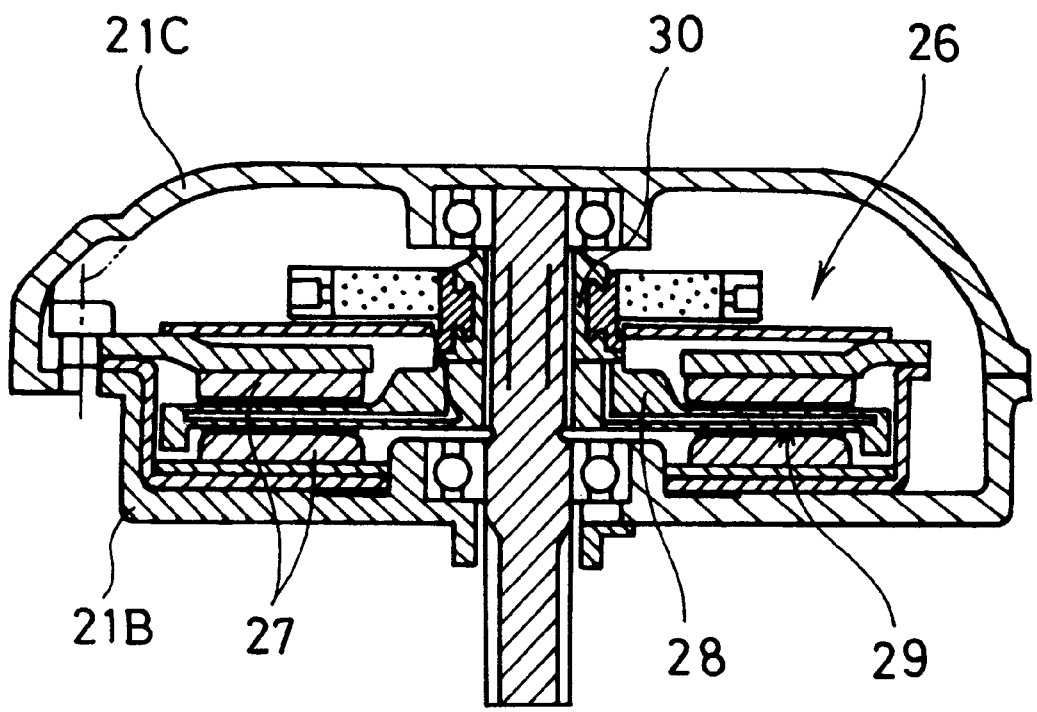
FIG. 3 is a sectional view showing the construction of a flat type DC motor employed in the motor powered driving assembly.

FIG 3 shows the construction of the flat type DC motor 26 employed in the motor powered driving assembly 20. One example of such motor is an axial cavity type motor as employed for condenser cooling in automotive air conditioners. Conventionally, as a power source for electric bicycles, an electric motor using a ferrite magnet has been employed, but the problem is that the output of such a motor is insufficient. Therefore, the flat type DC motor 26 uses a new high-performance permanent magnet 27. This permanent magnet 27 is comprised of a mixture of an isotropic Nd—Fe—B magnetic powder and an anisotropic Nd—Fe—B magnetic powder which has been set into shape by Joule heated sintering. Such magnets may be made as disclosed in Yamashita U.S. Pat. No. 5,624,503.

In the flat type DC motor 26, a coreless armature 28 is basically used, and an armature winding 29 and a commutator 30 are integrally formed by resin molding material. With such coreless construction, however, there involves considerable magnetic gap between the armature winding 29 and the permanent magnet 27, which makes it difficult to obtain a compact and high power motor. Therefore, the resin material for integrally forming the coreless armature 28 was blended with soft magnetic powder, and the armature winding 29 and the commutator 30 were integrally formed from the blended resin molding material.

This provided for high power performance, or about 2.5 times as high as conventional motors of same size, thus contributing to size and weight reduction with respect to the motor powered driving assembly 20.

The motor powered driving assembly 20 is set on the body frame 2 side through a mounting hole formed on the upper end of the casing 21. The motor powered driving assembly 20 mounted to the body frame 2 is such that the casing 21 is exposed except a part of its upper portion; therefore, during a bicycle run, wind strikes on the exposed portion so that heat generated from the flat type DC motor 26, control circuit 25, and the like is dissipated through the casing 21.

What is claimed is:

1. An electric bicycle, comprising
  (a) a frame (2) including a saddle pipe (6) having a saddle (5) connected therewith;
  (b) front (3) and rear (4) wheels rotatably connected with said frame;
  (c) a manually operated pedal driving assembly (10) connected with one of said wheels for rotating the same and including a pedal crank shaft (11); and
  (d) a motor powered driving assembly (20) arranged in a lower median portion of said frame below said saddle pipe and incorporating said pedal crank shaft for assisting said pedal driving assembly with rotating said one wheel, said motor powered driving assembly including
    (1) an electric motor (26);
    (2) a speed reduction mechanism (22) arranged between said motor and said pedal crank shaft; and
    (3) a control circuit (25) for activating said motor in accordance with the operating condition of said manually operated pedal driving assembly.

2. An electric bicycle as defined in claim 1, wherein said motor powered driving assembly further includes a pedal rotation sensor (23) for detecting the speed of rotation of said manually operated pedal driving assembly and a pedal load sensor (24) for detecting the torque load of said manually operated pedal driving assembly, said speed and torque load being used by said control circuit to control the actuation of said motor.

3. An electric bicycle as defined in claim 2, wherein at least a portion of said motor powered driving assembly is exposed.

4. An electric bicycle as defined in claim 2, wherein said electric motor comprises a flat type DC motor.

5. An electric bicycle as defined in claim 4, wherein said flat type DC motor is an axial air gap type motor.

6. An electric bicycle as defined in claim 4, wherein said flat type DC motor includes a coreless armature having a winding and a commutator integrally formed by resin.

7. An electric bicycle, comprising
  (a) a frame (2) including a saddle pipe (6) having a saddle (5) connected therewith;
  (b) front (3) and rear (4) wheels rotatably connected with said frame;
  (c) a manually operated pedal driving assembly (10) connected with one of said wheels for rotating the same and including a pedal crank shaft (11); and
  (d) a motor powered driving assembly (20) arranged in a lower median portion of said frame below said saddle pipe and connected with said pedal crank shaft for assisting said pedal driving assembly with rotating said one wheel, said motor powered driving assembly including a flat type DC motor having a permanent magnet formed of a mixture of an isotropic Nd—Fe—B magnetic powder and an anisotropic Nd—Fe—B magnetic powder which has been set into shape by Joule heated sintering.

8. An electric bicycle as defined in claim 7, wherein said flat type DC motor includes a coreless armature having a winding and a commutator integrally formed by resin.

9. An electric bicycle as defined in claim 8, wherein said coreless armature is formed of a resin compound containing soft magnetic powder.

10. An electric bicycle, comprising
  (a) a frame (2) including a saddle pipe (6) having a saddle (5) connected therewith;
  (b) front (3) and rear (4) wheels rotatably connected with said frame;
  (c) a manually operated pedal driving assembly (10) connected with one of said wheels for rotating the same and including a pedal crank shaft (11), a pedal rotation sensor (23) for detecting the speed of rotation of said manually operated pedal driving assembly and a pedal load sensor (24) for detecting the torque load of said manually operated pedal driving assembly; and
  (d) a motor powered driving assembly (20) arranged in a lower median portion of said frame below said saddle pipe and incorporating said pedal crank shaft for assisting said pedal driving assembly with rotating said one wheel, said motor powered driving assembly including
    (1) a flat type DC electric motor (26) including a permanent magnet formed of a mixture of an isotropic Nd—Fe—B magnetic powder and an anisotropic Nd—Fe—B magnetic powder;
    (2) a speed reduction mechanism (22) arranged between said motor and said pedal crank shaft; and
    (3) a control circuit (25) for activating said motor in accordance with the speed and torque load of said manually operated pedal driving assembly.

11. An electric bicycle, comprising
  (a) a frame (2) including a saddle pipe (6) having a saddle (5) connected therewith;
  (b) front (3) and rear (4) wheels rotatably connected with said frame;
  (c) a manually operated pedal driving assembly (10) connected with one of said wheels for rotating the same and including a pedal crank shaft (11), a pedal rotation sensor (23) for detecting the speed of rotation of said manually operated pedal driving assembly and a pedal load sensor (24) for detecting the torque load of said manually operated pedal driving assembly; and
  (d) a motor powered driving assembly (20) arranged in a lower median portion of said frame below said saddle pipe and incorporating said pedal crank shaft for assisting said pedal driving assembly with rotating said one wheel, said motor powered driving assembly including
    (1) a flat type DC electric motor (26) including a coreless armature formed of a resin compound containing soft magnetic powder and having a winding and a commutator integrally formed by resin;
    (2) a speed reduction mechanism (22) arranged between said motor and said pedal crank shaft; and
    (3) a control circuit (25) for activating said motor in accordance with the speed and torque load of said manually operated pedal driving assembly.

12. An electric bicycle, comprising
(a) a frame (2) including a saddle pipe (6) having a saddle (5) connected therewith;
(b) front (3) and rear (4) wheels rotatably connected with said frame;
(c) a manually operated pedal driving assembly (10) connected with one of said wheels for rotating the same and including a pedal crank shaft (11);
(d) a motor powered driving assembly (20) arranged in a lower median portion of said frame below said saddle pipe and incorporating said pedal crank shaft for assisting said pedal driving assembly with rotating said one wheel, said motor powered driving assembly including
  (1) a flat type DC electric motor (26);
  (2) a speed reduction mechanism (22) arranged between said motor and said pedal crank shaft; and
  (3) a control circuit (25) for activating said motor in accordance with the operating condition of said manually operated pedal driving assembly; and
(e) a battery case (8) accommodating a battery and arranged on a rear side of said saddle pipe.

* * * * *